United States Patent [19]

Sreenivasan

[11] 3,859,447

[45] Jan. 7, 1975

[54] MARGARINE
[75] Inventor: Baratham Sreenivasan, Hackensack, N.J.
[73] Assignee: Lever Brothers Company, New York, N.Y.
[22] Filed: Mar. 7, 1972
[21] Appl. No.: 232,641

Related U.S. Application Data
[62] Division of Ser. No. 69,780, July 27, 1970, Pat. No. 3,748,348.

[52] U.S. Cl................ 426/73, 426/175, 426/177, 426/195, 426/202
[51] Int. Cl............................................ A23d 3/00
[58] Field of Search .......... 99/118, 122 MO, 122 R, 99/123; 260/410.7; 426/194, 197, 73

[56] References Cited
UNITED STATES PATENTS
3,266,904  8/1966  Duin et al. ...................... 99/122 R Primary Examiner—A. Louis Monacell
Assistant Examiner—J. M. Hunter
Attorney, Agent, or Firm—Louis F. Kline, Jr.; Melvin H. Kurtz; Edgar E. Ruff

[57] ABSTRACT

Glyceridic oils having a high linoleic acid content, and having insufficient solid triglycerides to form a plastic margarine, are subjected to a directed interesterification process at temperatures of 0° to −15°C. using as a catalyst an alkali metal alkoxide along with an aprotic substance, namely dimethyl sulfoxide, dimethyl formamide, dimethyl acetamide, dimethyl cyanamide, or 3,3-dimethylaminopropionitrile. The combination catalyst allows the interesterification to proceed at a higher rate than when an alkoxide alone is used forming sufficient solid triglycerides, in seven days or less, that a plastic margarine having a linoleic acid-to-saturated acid ratio of 8 to 1 can be made therefrom without the presence of any hydrogenated stock, or having a linoleic acid-to-saturated acid ratio of 6 to 1 with a small proportion of hardstock.

7 Claims, No Drawings

MARGARINE

This is a division of application Ser. No. 69,780, filed July 27, 1970, now U.S. Pat. No. 3,748,348.

BACKGROUND OF THE INVENTION

FIELD OF THE INVENTION

This invention relates to a process for making a directed-interesterified glyceridic oil having a high linoleic acid content, and to a plastic margarine made therefrom.

Also the invention relates to an accelerated process for carrying out the directed interesterification of a high linoleic acid content glyceridic oil using as a catalyst a combination of an alkali metal alkoxide and either dimethyl sulfoxide, dimethyl formamide, dimethyl cyanamide, 3,3-dimethylaminopropionitrile, or mixtures thereof.

In a more particular embodiment, the invention relates to margarines made from directed-interesterified safflower or sunflower oil wherein the directed interesterification reaction is carried out using a catalyst which is a combination of an alkali metal alkoxide and an aprotic substance, such as dimethyl sulfoxide, dimethyl formamide, dimethyl acetamide, dimethyl cyanamide, or 3,3-dimethylaminopropionitrile.

In a specific embodiment, the invention relates to margarines which do not contain a hardstock, which are made from unhydrogenated edible glyceridic oils having at least about 50% linoleic acid, based on the total fatty acid content, and yet are shape retaining at room temperature.

It is well known that the natural glyceridic oils and fats are mixtures comprising glyceryl esters of fatty acids having different chain lengths and different degrees of unsaturation.

In recent years, nutritionists and medical practitioners have become increasingly aware of the dietary importance of polyunsaturated fats. The polyunsaturated fatty acids are, according to authorities, a dietary requirement for protection against fat-deficiency symptoms. Linoleic, linolenic, and arachidonic acids have been recognized as the chief polyunsaturated fatty acids which possess an appreciable biopotency in counteracting fat deficiency.

Linoleic, linolenic, and arachidonic acids are straight-chain aliphatic monocarboxylic acids, referred to in the art as fatty acids, which occur in nature combined as esters with glycerol. They have two, three, and four olefinic double bonds respectively in their molecular structure, and may be represented as follows:

Linoleic acid: 9,12,-octadecadienoic acid

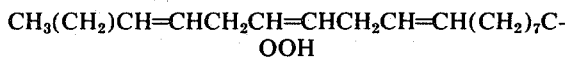

Linolenic acid: 9,12,15-octadecatrienoic acid

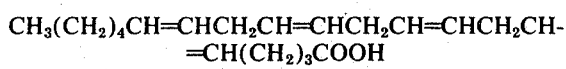

Arachidonic acid: 5,8,11,14-eicosatetraenoic acid

Polyunsaturated acids of the type described above are believed to be required for growth and for the maintenance of normal skin conditions by a wide variety of animals, including man. These fatty acids mediate not only growth but also certain diverse functions such as protection from x-irradiation injury, maintenance of capillary resistance in the skin capillaries, and the normal transport and metabolism of cholesterol.

Abnormally high blood cholesterol levels have been associated with atherosclerosis, leading medical authorities to prescribe diets which include fats and oils having a high polyunsaturated fatty acid content, in an effort to lower cholesterol levels.

Many medical experts believe that there is a relationship between the intake of polyunsaturated fatty acids and the level of plasma cholesterol. It has been reported that high levels of blood cholesterol can be reduced when large amounts of vegetable fats are included in the diet, and that the level will be increased when large amounts of animal fats are taken. The present-day trend toward the use of hydrogenated oils in food products leads to a lessened intake of polyunsaturated fatty acids, resulting in the esterification of body cholesterol with saturated fatty acids. These esters are not readily disposed of by the body, nor are phospholipids containing saturated fatty acids, but are retained to a great degree in the plasma. They may cause atheroma, a disease characterized by fatty degeneration of the inner coat of the arteries, and may increase the coagulability of the blood, and contribute to coronary and cerebral thrombosis.

An elaboration of the effects of polyunsaturated fatty acids in the body may be found in "Lipids" by H. J. Deuel, Jr., Vol. III, 1957, pps. 800-834.

Arachidonic acid occurs to some extent in marine oils, although these oils are not considered suitable for use in margarine without hydrogenation. The acid occurs only in very small amounts in animal fats, and for all practical purposes not at all in vegetable oils and fats. Thus it is impractical to attempt to introduce a high arachidonic acid content into a food product by the incorporation of a naturally occurring fat therein. This acid however is synthesized in the body by conversion from linoleic acid. Linoleic and linolenic acids are not synthesized in the body and must be taken in the diet.

Linoleic acid, usually along with small amounts of linolenic acid, occurs at a relatively high level combined as glycerides in a great number of well-known edible vegetable oils, for example safflower, tobaccoseed, sunflower, corn, soya, cottonseed, peanut, sesame, etc., as shown in the following Table I.

It will be recognized that the fatty acid percentages shown in the table are regarded as typical only, and that the percentages may vary with climate and geographical location.

Within this group of oils, those having about 50% or more linoleic acid and not more than about 10% linolenic acid are within the instant invention.

These oils comprise safflower and tobaccoseed oils, which when interesterified in accordance with the instant invention, have their principal utility in soft margarines when used alone, and sunflower, corn, cottonseed, and soybean oils having utility in both soft and print margarines.

Sunflower oil is an example of an oil having one or more varieties with a higher linoleic acid content and a lower saturated acid content than does the variety having the analysis shown in Table I. Varieties are known having 65% or more linoleic acid, and about 12% total saturated fatty acids.

It is not within the ambit of the present invention to have for an object the alleviation of fat-deficiency

TABLE I

TYPICAL COMPOSITIONS OF SOME SELECTED OILS*

| Fatty Acid | Corn | Cotton-seed | Hemp-seed | Lin-seed | Olive | Palm | Pea-nut | Saf-flower | Soy-bean | Sun-flower | Ses-ame | Rape-seed | Mus-tard-seed | To-bacco-seed | Tea-seed |
|---|---|---|---|---|---|---|---|---|---|---|---|---|---|---|---|
| Total saturated | 17 | 24 | 8 | 10 | 16 | 53 | 17 | 11 | 15 | 17 | 15 | 6 | 5 | 11 | 9 |
| Unsaturated: | | | | | | | | | | | | | | | |
| $C_{16}$ and lower | — | — | — | — | 2 | — | — | — | — | — | — | — | — | — | — |
| Oleic $C_{18:1}$ | 29 | 25 | 12 | 22 | 64 | 38 | 61 | 13 | 25 | 29 | 40 | 19 | 22 | 14 | 80 |
| Linoleic $C_{18:2}$ | 54 | 51 | 55 | 16 | 16 | 9 | 22 | 75 | 51 | 52 | 43 | 14 | 15 | 75 | 11 |
| Linolenic $C_{18:3}$ | — | — | 25 | 52 | 2 | — | — | 1 | 9 | 2 | 2 | 8 | 7 | — | — |
| Eicosenoic $C_{20:1}$ | — | — | — | — | — | — | — | — | — | — | — | 13 | 7 | — | — |
| Erucic $C_{22:1}$ | — | — | — | — | — | — | — | — | — | — | — | 40 | 44 | — | — |

The figures are those obtained by GLC analysis where available. Some figures are selected as "most probable" within a given range.
*Source material for data presented in Table I may be found in Bailey's "Industrial Oil and Fat Products", Third Ed., Interscience Publishers, 1964.

symptoms, nor is there any representation that the product of the invention has curative properties. However there has been disclosed a way to provide those who wish to use a margarine containing a high level of polyunsaturated fatty acids with a margarine product having the highest polyunsaturated fatty acid content attainable from naturally occurring glyceridic oils and fats.

Safflower oil and other oils having a high content of unsaturated fatty acids are currently marketed as salad oils, and persons desiring to enrich their intake of polyunsaturated fatty acids and decrease their intake of saturated acids can avail themselves of these products. It is evident that there is a need for other edible products containing high proportions of polyunsaturated fatty acids and low proportions of saturated acids to enlarge the scope of availability of such products.

One of the most popular foods is margarine, which is a food consumed in large quantities, and by people of all ages. Margarine contains at least 80% oleaginous matter (imitation margarines contain substantially less), and in view of its widespread use, is a particularly suitable product for the incorporation of an oil having a ligh content of polyunsaturated fatty acids.

In order to introduce as much polyunsaturated fatty acids, relative to the saturated fatty acids, as possible into the diet through the use of margarine, the triglyceride comprising the bulk of the oleaginous phase of the margarine will be non-hydrogenated and will advantageously be an oil that contains the highest proportion of polyunsaturated acids.

Safflower oil is available in commercial quantities and has the highest linoleic acid content of the vegetable oils available in large volume, and for this reason is the preferred oil for use to provide the highest possible polyunsaturated acid content and the lowest saturated fatty acid content.

Both print and soft margarines are well known in commerce. The print type is firmer and withstands commercial handling, but must contain more di- and tri-saturated triglycerides than the soft type to impart the required firmness. Greater proportions of the higher linoleic oils, such as safflower oil, can be incorporated in the soft-type margarine, but prior to the instant invention even the soft-type margarine required a hardstock, which lowered the proportion of polyunsaturated fatty acids and increased the proportion of saturated fatty acids available in the margarine.

THE PRIOR ART

Workers in the margarine and shortening art have developed methods for the directed interesterification of glyceridic oils and have attempted to prepare margarines having a high ratio of polyunsaturated fatty acids to saturated fatty acids. These attempts however have resulted in the use of a hardstock as one of the margarine components, thus lowering the polyunsaturated fatty acid content, or in the use of a directed-interesterification process that requires a relatively long time for completion.

Representative prior-art teachings are set forth below.

A process for directed interesterification of triglycerides is described in U.S. Pat. Nos. 2,442,531, 2,442,532, and 2,442,536 to Eckey.

These patents teach a rearrangement process wherein palm oil, cocoa butter, coconut oil, partially hydrogenated soybean oil, cottonseed oil, hydrogenated cottonseed oil, menhaden oil and kokum butter are subjected to the rearranging action of sodium alkoxide (methoxide to butoxide), the nearest approach to the instant invention being, with reference to cottonseed oil, the steps of allowing the reaction to proceed for about 11 days with incremental reduction in temperature from 70°F. to 40°F., followed by continuing the reaction for a further 10 days at 32°F.

Abbott, in U.S. Pat. No. 2,442,538, teaches that a margarine can be prepared from sunflower oil subjected to a directed interesterification process for 5 days at a minimum temperature of 40°F., using sodium methoxide as the sole catalyst. Abbott further teaches that the interesterified oil must be partially hydrogenated to increase the firmness of the product.

There is a suggestion in this patent that the added sodium methoxide or other alkoxide may not be the true catalyst, but that the true catalyst may be the product of the reaction between the added alkoxide and a minor constituent of the triglyceride, such as the tocopherols.

As the interesterification art progressed, solvents were used to fractionate oils subjected to directed interesterification as disclosed by Miller in U.S. Pat. No. 2,688,626 wherein the use of propane as a solvent is described, and by Huber et al. in U.S. Pat. No. 2,812,324 wherein the use of dimethyl sulfoxide and the like are described. Huber et al.'s process, except for the presence of the dialkyl sulfoxide, is entirely different from the instant process in that the former involves the reaction of an oligosaccharide (e.g., sucrose) with a fatty ester (e.g., methyl palmitate), a much higher (50°C.–150°C.) reaction temperature, and the use of much higher proportions of sulfoxide to act as a solvent for the reactants.

Similarly the art was aware of the value of dimethyl sulfoxide as a solvent in the high-temperature interesterification of inositol and a fatty ester, the proportions of dimethyl sulfoxide being sufficiently high to dissolve all of the inositol, as disclosed by Huber in U.S. Pat. No. 2,997,490.

The use of a carbanion catalyst, prepared from dimethyl sulfoxide and sodium or potassium hydride is disclosed by Artman et al. in U.S. Pat. No. 3,376,326 for the interesterification of oils. During interesterification, the triglycerides richer in linolenic acid content are continuously separated by a dual solvent system flowing countercurrently. One solvent is selected to dissolve triglycerides having a preponderance of linolenic acid radicals and is selected from the group consisting of dimethylformamide, dimethyl cyanamide, and 3,3-dimethylaminopropionitrile and mixtures thereof. Another solvent is selected to dissolve triglycerides having a preponderance of more saturated fatty acids and is selected from the group consisting of pentane through octane, and isomers and mixtures thereof. The same separation can be obtained if sodium or potassium t-butoxide is used as the catalyst in place of the abovementioned carbanion catalyst.

In U.S. Pat. Nos. 3,141,012 and 3,141,013 the use of dimethylformamide and other solvents is disclosed in a transesterification reaction between an ester, such as methyl palmitate, safflower oil, triethyl citrate or the like, and a polyhydric alcohol, for example sucrose or N-urea glucoside. The catalyst is potassium carbonate.

SUMMARY OF THE INVENTION

It has now been discovered that a nutritious margarine can be prepared that has a high polyunsaturated fatty acid content and at the same time has adequate plasticity and shape-retaining characteristics without the use of hardstock. This is accomplished by submitting a glyceridic oil, such as safflower oil or sunflower oil, etc. which has a high content of linoleic acid, to a directed interesterification process, as hereinafter described, and preparing a margarine therefrom. The present invention provides a margarine made wholly from non-hydrogenated, high linoleic acid oils, having a linoleic acid-to-saturated acid ratio as high as about 8 to 1. The invention also provides a margarine having present therein a small proportion of hardstock and having a linoleic acid-to-saturated acid ratio as high as about 6 to 1.

Accordingly, it is an object of the present invention to provide an improved directed-interesterification process for an oil having about 50% to about 79% linoleic acid and not more than about 10% linolenic acid whereby said oil may be made suitable for the preparation of a margarine without a hardstock in about 3 to about 9 days, usually about 4 to about 7 days.

It is another object of the invention to provide a plastic margarine which is an emulsion having an oleaginous phase, and an aqueous phase, said oleaginous phase comprising a non-hydrogenated, directed-interesterified triglyceride oil and minor additives, said directed-interesterified oil having a linoleic acid content of at least about 50%, and a linolenic acid content of not more than about 10%.

It is an additional object of the invention to provide a margarine which is an emulsion having about 80% to about 95% of an oleaginous phase, and about 20% to about 5% of an aqueous phase, said oleaginous phase comprising a non-hydrogenated, directed-interesterified triglyceride oil and minor additives, said directed-interesterified oil having a linoleic acid content of at least about 50%, and a linolenic acid content of not more than about 10%.

It is yet another object of the present invention to prepare a margarine wherein the oleaginous phase may be free from hydrogenated glyceridic oils and fats.

It is a further object of the invention to provide a margarine having the highest polyunsaturated fatty acid content attainable from natural oils.

The invention also provides an interesterified glyceridic oil having a linoleic acid content of about 50% to about 79% and a linolenic acid content of not more than about 10%, said interesterified glyceridic oil having a solid fat index of about 3 to about 25 at 0°C. and about 2 to about 12 at 21.1°C.

In another embodiment of the invention there is provided a directed-interesterified oil having about 50% to about 79% linoleic acid and not more than about 10% linolenic acid, for blending with about 5% to 10% hardstock to form a margarine characterized by economy of manufacture and a ratio of linoleic acid to saturated acid of about 6.

The invention also provides an edible oil having a linoleic acid to saturated acid ratio of at least about 10 to 1.

Within the group of suitable oils mentioned hereinbefore, soybean oil, having the highest proportion of linolenic acid of the foregoing oils, i.e., about 9%, may present organoleptic problems on prolonged storage, and for this reason soybean oil is the least preferred of all the oils within the invention, the most preferred being safflower and tobaccoseed oils, with sunflower, cottonseed, and corn oils being next respectively in order of preference. The oils suitable for use within this invention with the exception of soybean oil, have a linolenic acid content of not more than about 3%, and accordingly it is an preferred embodiment that the oil which is subjected to the directed interesterified process in accordance with the present invention have a linoleic acid content of not over about 3%, and that the interesterified oil therefrom have a solid fat index of about 2 to about 7 at 21.1°C.

The directed interesterified oil of this invention is useful not only as the sole triglyceride in a margarine, but may be admixed with other oils or fats to satisfy certain specific consumer preferences while providing a high ratio of linoleic acid to saturated acids. For example, 80% of the interesterified oil of the invention may be admixed with 20% butter to provide a product which is an excellent compromise for people who prefer butter but also desire a lower intake of saturated fatty acids and more polyunsaturated fatty acids than are provided by butter. The aforementioned blend has a linoleic acid to saturated acid ratio of 3.2. Or if desired, to effect a further reduction in the cost of the margarine, up to about an equal weight of non-interesterified oil or randomly interesterified oil may be mixed with the directed interesterified product and used with about 5% to 10% hardstock to make a margarine having a high, i.e., 6 to 1, ratio of linoleic acid to saturated acids.

The present invention finds its greatest utility in the preparation of plastic margarine. However, because of the greater rapidity with which the directed interesterification takes place when the process of the invention is used, some processing economy is effected, and this economy provides ancillary benefits. For example advantage may be taken of the invention in the preparation of a salad oil. The solids formed by the directed interesterification process of the invention may be filtered off, the filtrate washed, refined, bleached and deodorized, and it is then suitable for use as a salad oil having at least a 10 to 1 ratio of linoleic acid to saturated acids.

These and other objects of the invention are accomplished by subjecting to a directed interesterification process using a catalyst developed from a low molecular weight alkoxide and an aprotic substance, under conditions described hereinafter, a glyceridic oil comprising glycerides of mixed fatty acids of differing chain length having at least about 50% linoleic acid and not more than about 10% linolenic acid and subsequently preparing a margarine from said interesterified oil.

The triesters are often referred to as triglycerides, and the partial esters, i.e., mono- and diesters, are referred to as partial glycerides, or as monoglycerides and diglycerides, respectively.

The expression "oleaginous matter" is intended herein to refer to all of the substances having fatty or oily characteristics that are conventionally included in margarine. A glyceridic oil mikes up the bulk of the oleaginous matter, with optionally a hardstock which may be a fat having a low iodine value and a high saturated fatty acid content, butter, emulsifiers, stabilizers, preservatives, and the like. "Oleaginous phase" refers to the oleaginous matter when emulsified with an aqueous phase in the preparation of a margarine.

The term "minor additives" as used herein refers to the substances that a formulator might incorporate in small proportions into the glyceridic oil in the preparation of a margarine. Minor additives include stabilizers and emulsifiers, such as lecithin, mono/diglycerides, sodium monostearin sulfoacetate, stearoyl-2-lactylate, etc., and mixtures thereof, usually present at levels variously ranging from about 0.2% to about 0.4% by weight, preservatives such as citric acid, isopropyl citrate, and stearylcitrate, usually present at levels of about 0.005% to about 0.15%, flavoring substances, usually present at levels of about 25 ppm to about 1000 ppm, and vitamins, such as vitamin A at levels of at lezst 1500 International Units per pound of margarine, and colorants, such as carotene at levels of about 4000 to about 6500 International Units per pound of margarine.

The term "total fatty acids" is well known in the fats and oils art to refer to the amount of fatty acids that can be obtained, usually quantitatively, from a fat or oil by hydrolysis or alkaline saponification, followed by solvent extraction or other separation from an acid aqueous medium.

When reference is made in the specification and claims to the percentage of polyunsaturated or saturated fatty acid content of an oil or fat, it will be understood that the percentage is calculated on the basis of the total fatty acid content.

The unqualified terms "oil" or "fat" as used throughout this specification and claims refer to glycerides that are composed principally of triglycerides, either natural, or synthesized for example by reacting glycerol or a partial glyceride with a natural or synthetic fatty acid.

The two terms may for many purposes be used interchangeably, but the glycerides liquid at about room temperature, i.e., about 25°C., are generally thought of as oils, while the remainder are generally thought of as fats.

The word "polyunsaturated" as used herein has the usual meaning, referring to the presence of more than one olefinic double bond in a fatty acid molecule or in an acyl moiety.

By "directed interesterification" is meant a process wherein the triglycerides solid at the lower temperatures are removed by crystallization from the reaction zone during an ester interchange reaction.

The term "margarine" as used herein to apply to the present invention refers not only to the product described tin 21 CFR 45.1 defining the Federal Standards of Identity for margarine as having at least 80% fat, but also to other plastic oleaginous emulsions comprising substantial proportions of oil or fat, but less that 80%, the balance being an aqueous phase containing some or all of the ingredients described herein.

By way of leading to a better understanding of the directed interesterification process, the random interesterification process will be briefly discussed, since randomization occurs as the initial step, or first step, in a directed interesterification process.

By "random interesterification" is meant interchange of fatty acid radicals on the glyceryl radicals in random fashion. The interchange continues dynamically under the influence of a catalyst, until the mixture of molecular configurations reaches an equilibrium in accordance with the laws of probability. The term "molecular configuration" refers to the identity of the three fatty acid, or acyl (RC=0) radicals combined with one glyceryl radical. All three fatty acid radicals in some molecules will be saturated, and in others unsaturated, either of the same chain length or of differing chain lengths. In other molecules, there will be two saturated and one unsaturated fatty acid radicals and in still others this pattern will be reversed, the several chain lengths being randomly distributed. The overall combined fatty acid distribution with respect to chain length and degree of unsaturation is not altered by the random interesterification process. Molecules of glycerides having mixed combined fatty acid radicals will include those known as, for example, trilinolein, dilinoleo-monoolein, dilinoleo-monostearin, tristearin, distearo-monoolein, distearo-monopalmitin, monostearo-diolein, dimyristo-monoolein, triolein, etc. Thus RC in the acyl radical RC=O shown above may be a saturated hydrocarbon radical such as $C_{12}H_{25}^-$, $C_{14}H_{29}^-$, $C_{16}H_{33}^-$, $C_{18}H_{37}^-$, $C_{20}H_{41}^-$, or the corresponding mono- or polyunsaturated radicals. The natural oils do not contain important proportions of unsaturated radicals having chain lengths under $C_{18}$.

Randomization as understood to take place for use in the invention includes random positioning of the fatty acid radicals within a triglyceride molecule with respect to 1,2-positioning, as well as random distribution of the fatty acids among the glyceride molecules. The randomized mixture will contain for example:
  a. 1,1-distearo-2-olein
  b. 1,1-dilinoleo-2-olein
  c. 1-stearo-1-palmito-2-linolein
  d. 1,2-dilinoleo-1-myristin
  e. 1,2-dilinoleno-1-palmitin
  f. trilinolein Those skilled in the art will know all the possible configurations, only a few of which are set forth above.

The molar percentages of the trisaturated, triunsaturated, and mixed saturated-unsaturated molecules at random equilibrium, leaving out of consideration the varying molecular weights of the mixed fatty acids and the possible positional isomers, may be calcuated by the following formula, based on the formula found in Bailey, "Industrial Oil and Fat Products" Second Ed., 1951, Interscience Publishers, Inc., page 834.

% trisaturated = $(\bar{s})^3 \times 1/10,000$

% disaturated-monounsaturated = $3 \times (\bar{s})^2 \times \bar{u} \times 1/10,000$ % diunsaturated-monosaturated = $3 \times \bar{s} \times (\bar{u})^2 \times 1/10,000$ % triunsaturated $\times (\bar{u})^3 \times 1/10,000$ wherein $\bar{s}$ = the molar percentage of saturated acids
$\bar{u}$ = the molar percentage of unsaturated acids and $\bar{s} + \bar{u} = 100$ As a general description of the directed-interesterification process, a high-linoleic oil, such as sunflower oil or safflower oil, is first dried at about 100°C. under nitrogen, the temperature adjusted to 25°C. to 150°C. as desired, preferably about 50°C. to 100°C., and typically about 50°C., and the desired quantity of aprotic substance added and thoroughly mixed with the oil. The appropriate quantity of alkoxide is then added, either as powder or preferably as a slurry in xylene, with vigorous agitation, and the oil agitated for a time at least until random interesterification is reached, usually about ½ to 1 hour, at a tempeature within the range of about 25°C. to about 150°C., as may be selected for the particular system. The brown color which is characteristic of the interesterification process begins to form almost immediately after adding the alkoxide and develops to its full depth, usually a chocolate brown color, within the next minute or two. It is believed that the development of the brown color is associated with the formation of the active catalyst.

After having been agitated at a temperature of about 25°C. to about 150°C., for a time at least until random interesterification has reached equilibrium in accordance with the laws of probability, the oil is chilled to a temperature of about 0°C. to about 20°C. and held at a temperature of about −20°C. to about +10°C. under a nitrogen blanket for a few days, usually about 7 to 9 days in the case of safflower oil and about 3 days for sunflower and oils of similar linoleic acid content. If desired, the oil may be held at about −5°C. to about −20°C. for ½ to 1 day, or longer if desired, then at about 0°C. to +10°C. for the remainder of the period, for example about 3 to about 9 days.

At the end of the chilling period, the catalyst is deactivated by the addition to the oil of dilute aqueous mineral acid such as sulfuric or phosphoric acid, the aqueous phase thereby formed is separated, and the oil is washed, refined, bleached, and deodorized.

In the process of the present invention the crystallized solid portion is preferably not isolated from the liquid portion, nor is any fraction separated from another when the interesterified oil is used for the preparation of maragine. The entire interesterified oil without fractionation as used for margarine preparation has an overall fatty acid composition substantially unchanged from that of the triglyceride oil prior to interesterification. However if desired, as shown hereinafter in Examples 19 and 20, a liquid fraction may be separated from the solids of the directed-interesterified oil to provide, in the case of safflower and tobaccoseed oils for example, a liquid oil having a linoleic acid to saturated acid ratio of about 10 to about 20 or even higer, depending upon the efficency of separation. The separated solid fat may be used in margarine or shortening.

The equilibrium composition characteristic of random distribution as discussed above is altered in the directed interesterification process of the invention, because of the continuous crystallization of the higher melting triglycerides as they are formed after chilling, as well as those already formed during the randomization at the higher temperature, thus removing the said higher melting triglycerides from the liquid reaction zone and continuously making the liquid reaction zone poorer in saturated fatty acid radicals until no more of the triglycerides are formed which crystallize at the temperature of the process. At this point the intesterification reaction is stopped, the crystallized triglycerides re-melted and mixed with the uncrystallized liquid portion, the mixture refined and bleached if desired, to form an oil or fat richer than the initial oil in solid fat content, with no change in polyunsaturated fatty acid content, and suitable for making a margarine without the need to blend any other oil or fat therewith.

After randomization, the safflower, sunflower, and cottonseed oils used in the Examples have the following distribution of saturated and unsaturated acyl groups on the glyceryl portion of triglyceride molecule:

| Glyceride Type | Safflower Oil | Sunflower Oil | Cottonseed Oil |
| --- | --- | --- | --- |
| % Trisaturated ($S_3$) | 0.1 | 0.1 | 1.4 |
| % Disaturated ($S_2U$) | 3.5 | 4.3 | 13.3 |
| % Monosaturated ($SU_2$) | 23.9 | 27.6 | 41.5 |
| % Triunsaturated ($U_3$) | 72.5 | 68.0 | 43.8 |

If such a randomized mixture of glycerides is cooled to its crystallization point the $S_3$ and $S_2U$ glycerides will start crystallizing, thereby upsetting the equilibrium. The catalyst will then produce more of these glycerides from the $SU_2$ in order to restore the equilibrium. If the temperature chosen is such that these new glycerides will crystallize as they are formed then theoretically the reaction will be terminated only when all the glycerides that can be crystallized out at this temperature are formed and no more acids forming these glycerides are present in the liquid portion. Since in this stage, the reaction is directed towards the formation of crystallizable glycerides, it is referred to as directed interesterification.

The entire process comprises three important stages.
1. Active catalyst formation and its regeneration during subsequent stages.
2. Randomization of the glycerides of the parent oil.
3. Crystallization of solid glycerides formed in the above reaction initiating directed interesterification.

THE CATALYST

Certain liquid substances, which are familiar for their solvent characteristics, such as for example dimethyl sulfoxide, dimethylformamide, dimethylacetamide, dimethyl cyanamide, and 3,3-dimethylaminopropionitrile, etc. do not protonate, and do not depend upon an acid or basic reaction for their solvent activity. Such

TABLE II

SAFFLOWER OIL; PILOT PLANT SCALE; 0.5% SODIUM METHOXIDE; REACTED AT 0°C.

| Aprotic Substance | Prechilled To | 0-1 | 1-2 | 2-3 | 3-4 | 4-5 | 5-6 | 6-7 | 7-8 | 8-9 | 9-10 | 10-11 | 11-13 | 14-15 | over 15 |
|---|---|---|---|---|---|---|---|---|---|---|---|---|---|---|---|
| none | not prechilled | 0 | | 0 | | | | 0 | | | | 0 | 0 | | |
| none | -9°C. | | | | | 1.3 | | 2.1 | | | 2.1 | | 2.3 | 2.3 | 2.4 |
| 20% DMF | -7°C. | | 2.1 | 2.5 | | | 3.1 | | | 3.2 | | | 3.3 | | |
| 39% DMF | not prechilled | | | | 3.4 | 4.4 | | 4.1 | | | 4.4 | | | | |
| 1% DMSO | -4°C. | 1.6 | | | 2.7 | | 3.1 | | 3.6 | | | 4.0 | 4.3 | | |

TABLE IIa

SAFFLOWER OIL; LABORATORY SCALE; 0.5% SODIUM METHOXIDE; REACTED AT 0°C.

| Aprotic Substance | Prechilled To | 0-1 | 1-2 | 2-3 | 3-4 | 4-5 | 5-6 | 6-7 | 7-8 | 8-9 | 9-10 | 10-11 | 11-12 | 14-15 | 15-21 |
|---|---|---|---|---|---|---|---|---|---|---|---|---|---|---|---|
| none | not prechilled | | | | 0 | | | 0 | | | | 0 | | | 0.3 |
| none | -8°C. | | | 0 | | | 0.9 | | | 1.7 | | | | 2.2 | 2.6 |
| 1% DMF | not prechilled | 2.0 | | 4.5 | | 3.4 | | | | | 3.6 | | | 3.4 | 4.3 |
| 2.5% DMF | " | | 1.1 | 3.0 | | | | 4.1 | | 3.6 | | | | 4.3 | 4.7 |
| 5% DMF | " | 2.0 | | 2.7 | | 4.1 | | | | | 3.5 | | | 4.0 | 4.3 |
| 40% DMF | " | 0.4 | 1.6 | 1.6 | 2.3 | | | 4.2 | | 4.3 | | 4.3 | | 3.6 | 3.2 |
| 1% DMSO | " | | | 2.0 | | 3.1 | | 3.8 | | | | 4.2 | | | 4.4 |

DMF is dimethyl formamide
DMSO is dimethyl sulfoxide substances are termed "aprotic". These aprotic substances, in combination with an alkoxide, constitute the catalysts of the present invention. The basic activity of the alkoxides is increased in the presence of the aprotic substance, which rapidly and effectively disperses the alkoxide throughout the oil. The increased basicity and better dispersion results in a more rapid interesterification reaction than occurs in the absence of the aprotic substance. The more rapid interesterification reaction is observed in the first step wherein the oil is randomized at elevated temperatures. Without the presence of the aprotic substance, it requires about 5 to 15 minutes at 70°C. for the characteristic brown color of the interesterification process to develop after the addition of the alkoxide, whereas in the presence of the aprotic substances, usually less than 1 minute and not more than 3 minutes is required at temperatures of 25°C. to 70°C.

In the chilling and crystallizing step very little solid glycerides are formed even after 21 days at 0°C. in the absence of the aprotic substance. If under the same conditions the oil is first chilled to −10°C. to induce crystallization then held at 0°C. solid glycerides develop very slowly and are still forming after 21 days. However in the presence of dimethylformamide, dimethyl sulfoxide or other aprotic substance of the present invention, solid glycerides develop rapidly during cooling, requiring no prechilling. The rate of solid glyceride development is quite fast at 0°C., the SFI values reaching a peak in about 3 to 9 days and typically about 4 to 6 days, and levelling off thereafter. Since dimethylformamide is miscible at high levels with the oil, various proportions may be used, and optimum conditions are attained at a level of about 2½-5%. Though dimethyl sulfoxide has only a limited miscibility with the oil, a comparable reaction is obtained at about a 1% level.

The progress of the directed interesterification reaction can be illustrated by means of SFI values of samples taken from selected experimental runs during reaction at 0°C. The oil is interesterified within the general procedure described hereinbefore.

Dimethyl sulfoxide is miscible with safflower oil to the extent of 2 parts per 100 parts of oil at 25° to 27°C. Dimethyl formamide is miscible to the extent of 38 parts per 100 parts of safflower oil. Miscibility is lower in the more saturated oils and at lower temperatures.

The aprotic substance is useful within the range of about 0.5% to about 50%, preferably about 1% to about 30%, although it would not normally be used above the miscibility limit of the particular substance employed.

The alkoxide may be an alkali metal, sodium potassium or lithium, and especially sodium, alkoxide, such as methoxide, ethoxide, n-propoxide, isopropoxide, n-butoxide, isobutoxide, tertiary butoxide, glyceroxide, and the alkoxide of mono- or diglycerides. The alkoxide is useful over the range of about 0.2% to about 3%, based on the weight of the oil. The alkoxide has the chemical formula ROM, wherein R is an alkyl group having one to about four carbon atoms, a dihydroxylalkyl group having three carbon atoms, and the mono- and diacyl derivatives thereof, the acyl radicals having from about eight to about 18 carbon atoms. The alkoxides having one or two acyl groups are most conveniently derived from natural oils and fats such as coconut oil, tallow, safflower oil, cottonseed oil, etc., and have the formulas

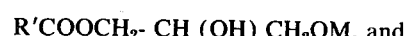

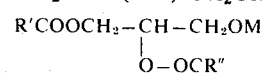

wherein R' and R" are alkyl or alkylene groups having from about seven to about 17 carbon atoms, and may be the same or different. M is an alkali metal, and may be sodium, potassium, or lithium, preferably sodium.

The efficiency of the alkoxide catalyst decreases with increasing molecular weight, the most efficient being sodium methoxide. The branched chain alkoxides are somewhat less efficient than the staight chain catalysts. Sodium tert-butoxide is sufficiently effective as a catalyst for cottonseed oil and other oils having a relatively high saturated fatty acid content, but would not normally be used for oils such as safflower for which a more effective catalyst such as sodium methoxide would be used.

Although the inventor does not wish to be held to any theory or postulated mechanism regarding the present invention, it appears that the rate of interesterification is increased by the presence of the aprotic substance during the chilling state (e.g., 0°C.) as well as at the aforementioned elevated temperatures. It also may be postulated that the miscibility of aprotic substance and oil is a mutual effect, and that there is less miscibility of oil in the aprotic substance at lower temperatures and at greater saturation of fatty acid radicals.

Randomization is a very fast reaction and proceeds to equilibrium with most oils in 15–30 minutes once a minimum amount of active catalyst is formed. It is postulated that the active catalyst is structurally similar to that of the glycerides, and is more soluble in the oil as well as in the mixture of oil and aprotic substance, thus causing randomization equilibrium to occur much sooner than in the presence of oil alone as the medium. Proof of this could be obtained by working with an oil such as cottonseed oil and determining the melting point at different stages, as the randomized oil has a much higher melting point than the parent oil. The active catalyst formation is a slow reaction and is entirely dependent on how well the external catalyst such as the methoxide is made to interact with the glyceride. The enhanced activity of the catalyst in the presence of the aprotic substance suggests that the aprotic substance in some manner acts to accelerate the usually slow interaction between a solid and a liquid substance, specifically in this instance the alkoxide powder and the liquid oil. Solubility of the external catalyst in the medium, freedom of its anion for reaction, (nonentanglement by solvation hydrogen bonding) and the absence of side reactions are the factors that will determine the extent of active cataylst formation.

The higher rate of interesterification at the lower temperatures resulting from the activating effect of the aprotic substance on the alkoxide, along with the lower miscibilty of the more saturated triglycerides with the aprotic substances, and the ability of said substance to improve the dispersion of the catalyst throughout the non-crystallized phase, are believed to be factors cooperating to lessen the time required to interesterify in a directed manner to the extent required to make them suitable for the preparation of a margarine without the use of a hydrogenated oil. In fact, no prior-art interesterification method applied to safflower oil known to the inventor, even under the best conditions, yields an oil suitable for the preparation of a margarine without a hardstock or a hydrogenated oil.

The interesterified oils of the instant invention are useful in the preparation of both soft margarines and print margarines. Generally speaking, oils of the safflower type having over 70% linoleic acid are preferred for making soft margarine, while oils such as sunflower, having 50–55% linoleic acid, are preferred in the preparation of print margarine.

The ratio of linoleic acid to saturated fatty acids in the interesterified oil and in the margarine ranges from about 2 to about 8, and preferably about 4.5 to about 8, and typically from about 4.5 to about 6. Ratios of less than 5 are preferred for print margarines. Soft print and soft tub margarines will have the higher ratios, i.e., about 5 to about 8.

The margarines of the invention may be characterized by penetration values, and the interesterified oils as well as the margarines may be characterized by the solid fat index (SFI). The soft margarines offer less resistance than do the print type to the penetration of the cone of a penetrometer and consequently the cone will penetrate deeper in the test described below, resulting in higher penetration values than obtained for the print margarines, although in some instances it has been noted that margarine made in print form, because of the working during processing, may be actually softer by penetration tests than "soft" margarine made from the same stock.

The penetration values are obtained by allowing a 47-gram cone having an apex angle of 15°46' to drop vertically on the body of the margarine from a height of 20 mm. The number of tenths of a millimeter which the cone penetrates below the surface is recorded as the "penetration". The soft margarines of the invention have penetrations at 45°F. (7.2°C.) ranging from about 200 to about 400, while the print margarines have penetrations ranging from about 200 to about 300 at this temperature.

The solid fat index relates to the proportion of solid triglycerides in the oil as measured under specified conditions. It is calculated from dilatometer measurements as described in AOCS Tentative Method Cd 10-57 (1961).

The solid fat index of the oil after the directed interesterification is carried to substantial equilibrium, ranges from about 2 to about 7 at 21.1°C. and about 3 to about 12 at 0°C. for most of the oils to which the invention applies. The upper limits for corn and cottonseed oils are higher, being respectively about 9 and about 12 at 21.1°C. and about 18 and about 25 at 0°C. The SFI of the margarine may range from about 2 to about 12 at 21.1°C.

Both the soft and print-type margarines of the invention may be prepared by their respective conventional methods. The process for preparing the soft margarines of the invention comprises subjecting a glyceridic oil to a directed-interesterification process, thereby increasing the proportion of solid fat while not changing the proportion of polyunsaturated fatty acids, the proportion of linoleic acid being at least about 50%, and the proportion of linolenic acid being not more than about 10%, subjecting the blend optionally to a refining process, then to a deodorizing process, followed by mixing in an edible emulsifier, such as mono- and diglycerides, lecithin, or sodium monostearin sulfoacetate, and if desired, a hardstock, colorant (e.g. carotene) and vitamins. The oleaginous mixture of oil, emulsifier, and optionally, a hardstock, colorant and vitamins, is emulsified with an aqueous phase to form a water-in-oil emulsion at a temperature at which the oleaginous mixture is liquid, for example 38°C. to 42°C., and preferably about 40°C. to 42°C. The water usually but not necessarily, has dissolved therein one or more of the substances listed in Table III. Skim milk may be used in place of water. The emulsion is pumped through a scraped-surface heat exchanger such as a Votator, a description of which is found in "Industrial Oil and Fat Products", Bailey 3rd ed., p. 1066, Interscience Publishers, Inc. 1964. If a slightly aerated product is desired, a gas such as nitrogen or air is introduced into the emulsion prior to reaching the heat exchanger. The emulsion is supercooled in the Votator and leaves the A unit in a substantially liquid state at a temperature of for example 8°C. to 12°C. It is then passed through the B unit (mixer) with release of pressure if the gas has been incorporated, and a change in state of the gas from solution to occlusion while the fat is crystallizing. The margarine leaves the B unit at a temperature usually within the range of 10° to 16°C. and flows into containers, serving as molds, then is tempered to solidify into a firm, shaped mass. Preferably the tempering is carried at a temperature of about 7°C. to about 10°C. and for a time of about 24 hours, but may be carried out at room temperature (e.g., about 20°C. to about 30°C.), if desired.

In the preparation of a print margarine, the process follows the foregoing description, except that the margarine leaving the B unit is fed through holding tubes to crystallize then through the print former in the conventional manner.

A preferred food product of the present invention comprises a margarine having at least 80% oleaginous matter, the balance being an aqueous phase. The benefits of the invention are realized when the fat content is about 80% to about 95% and even below this range.

The proportion of polyunsaturated fatty acids in the fat phase, or oleaginous phase, of the margarine may be from about 50% to about 79%. Although the polyunsaturated fatty acid may be somewhat lower, for example, about 48%, it will be understood that the instant invention is of greatest benefit when the polyunsaturated fatty acid content is in the upper region of a practical range, for example about 65% to about 79%, and preferably from about 70% to about 75%, based on the weight of the oleaginous phase.

The non-hydrogenated glyceride oils necessary for the practice of the instant invention have a linoleic acid content of about 50% to about 79%, and a saturated fatty acid content of about 5% to about 25%.

Safflower oil useful in the practice of the invention may have a linoleic acid content of about 73% to about 79%, and a saturated fatty acid content of about 7% to about 12%, based on the weight of the total fatty acids in the oil.

The safflower oil used in the Examples is identified as follows:

| | |
|---|---|
| Iodine Value | 144.0 |
| Palmitic acid | 6.5% |
| Stearic acid | 2.5% |
| Oleic acid | 12.3% |
| Linoleic acid | 77.6% |
| Other acids | 1.1% |
| Solid Fat Index (21.1°C.) | 0 |
| Ratio of Linoleic acid to saturated acids | 8.0 |

The sunflower oil has the following characteristics:

| | |
|---|---|
| Iodine Value | 135.0 |
| Palmitic acid | 6.1% |
| Stearic acid | 5.0% |
| Oleic acid | 16.7% |
| Linoleic acid | 70.4% |
| Other acids | 1.8% |
| | 100.0% |

The acids listed above are of course present as glycerides.

The molecular configurations before interesterification with respect to saturated acids, oleic acid and linoleic acid, typical of the safflower and cottonseed oils used in the Examples, are as follows:

| | Molar % | |
|---|---|---|
| | Safflower | Cottonseed |
| oleic-saturated-saturated | None | 5 |
| linoleic-saturated-saturated | 2 | 17 |
| oleic-oleic-saturated | 1 | 3 |
| linoleic-oleic-saturated | 7 | — |
| linoleic-linoleic-saturated | 18 | 29 |
| oleic-oleic-oleic | 1 | — |
| linoleic-oleic-oleic | 5 | 15 |
| linoleic-linoleic-oleic | 19 | 14 |
| linoleic-linoleic-linoleic | 47 | 17 |
| | 100 | 100 |

Expressed in terms of molar percentage of saturated and unsaturated fatty acids, the structures of typical safflower and cottonseed oils are as follows:

| | Safflower | Cottonseed |
|---|---|---|
| trisaturated | None | None |
| disaturated | 2 | 22 |
| monosaturated | 26 | 32 |
| tri-unsaturated | 72 | 46 |

A more nearly complete percentage fatty acid analysis of the safflower, sunflower, and cottonseed oils used in the Examples is set forth below:

| | Safflower Oil | Sunflower Oil | Cottonseed Oil |
|---|---|---|---|
| Iodine Value | 144.0 | 135.0 | 114.8 |
| *8 | — | — | — |
| 10 | — | — | tr |
| 12 | 0.1 | — | tr |
| 14 | 0.1 | tr | 0.8 |
| 15 | tr | — | tr |
| 15:1 | — | — | — |
| 16 | 6.5 | 6.1 | 21.0 |
| 16:1 | 0.2 | — | 0.7 |
| 17 | tr | — | tr |
| 17:1 | tr | — | — |
| 18 | 2.5 | 5.0 | 2.3 |
| 18:1 | 12.3 | 16.7 | 17.0 |
| 18:2 | 77.6 | 70.4 | 58.0 |
| 18:3 | 0.9 | 0.5 | 0.3 |
| 22 | — | 0.7 | — |
| 24 | — | — | — |
| 24:1 | — | — | — |
| % Saturated acids | 9.7 | 12.3 | 24.1 |
| % Linoleic acid | 77.6 | 70.4 | 58.0 |
| Ratio of linoleic acid to saturated acids | 8.0 | 5.7 | 2.4 |

*Figures in this column are the number of carbon atoms in the fatty acids. Figures following a colon represent the number of double bonds per molecule of fatty acid.

tr = trace

It is well known in the art to employ a small amount of hardstock in both soft and print margarines, usually in the proportion of about 15% to about 25%. While hardstock may be employed in conjunction with the directed interesterified oils of this invention, in the preparation of margarine, it is not necessary to do so, since a satisfactory product can be made using the directed interesterified oils prepared according to the invention as the only fat source. If in some instances it may appear desirable to increase the firmness of soft margarine made in accordance with the invention, this may be done by the addition of not over about 5% to about 10% hardstock. The proportion of hardstock, if used, will be held to a minimum to maintain a high ratio of linoleic acid to saturated acids.

If it is desired to employ a hardstock in the composition, it may be any triglyceride or mixture of triglycerides characterized by an iodine value between about 35 and about 70, and preferably between about 40 and about 55, and by a saturated acid content of between about 25% and about 60%, preferably between about 33% and about 53%, based on the total fatty acid content. Suitable hardstocks are partially hydrogenated rapeseed oil having an iodine value of 53–55, a 50/50 mixture of cottonseed winter oil stearine and peanut oil having an iodine value of 40–50, or partially hydrogenated cottonseed, soybean, peanut, corn, safflower, or mustardseed oils or mixtures of the above, having iodine values between about 35 and about 70. In general, the higher the proportion of hardstock in the margarine, the higher the iodine value should be within the abovementioned range.

Cottonseed winter oil stearine is the term applied to the solid fraction from the winterizing of cottonseed oil. In a winterizing process, the oil is chilled for example to about 45°F. to about 50°F. and the solid components allowed to crystallize over a period of time. The solid fraction is then separated from the liquid fraction. The solid fraction or "stearine" contains some entrapped liquid oil, the amount being variable from batch to batch.

The expression "aqueous phase" herein refers to water or to water with the usual water soluble additives (see Table III below) solubilized therein, which is the minor phase of the water-in-oil emulsions (margarines) of the invention.

The aqueous phase may contain water, salt, potassium sorbate, flavor, ground soybeans, or milk in the form of whole milk, cream skim milk, or reconstituted skim milk.

Some suitable compositions for the aqueous phase are set forth in Table III. The figures are parts by weight, unless otherwise noted.

The invention will be more fully understood in view of the detailed description set forth in the Examples which follow, which are illustrative but not limitative of the invention.

EXAMPLE 1

Three thousand gm. of safflower oil are placed in a flask with a mechanical stirrer and a bubbling device, and dried at 100°C. under a gentle stream of nitrogen for 1 hour. The oil is cooled to 50°C. and 30 gm. (1% basis oil) dimethyl sulfoxide are added, with stirring. After the dimethyl sulfoxide is thoroughly mixed with the oil, 15 gm. (0.5% basis oil) sodium methoxide slurried in 20 gm. xylene are added under vigorous agitation. Within a few seconds the characteristic chocolate brown color of the interesterification reaction begins to develop and attains its maximum shade within the next minute. This is the stage wherein the active catalyst development takes place. The reaction is allowed to proceed for 1 hour. The reaction mass is transferred to one-pint containers, then tightly closed and placed in a refrigerator at 0°C. Periodic samples are removed, acidified with dilute mineral acid to deactivate the catalyst, then washed free of acid and dried under vacuum with the assistance of bubbling nitrogen. The Solid Fat Index (SFI) values of samples taken at intervals of safflower oil processed by the above method are given in Table IV. These figures show the progress of the formation of solid triglycerides.

TABLE IV

| | SOLID FAT INDEX | | | |
|---|---|---|---|---|
| Days at 0°C. | 0°C. | 21.1°C. | 33.3°C. | 40°C. |
| 3 | 2 | 1.5 | 0.5 | 0 |
| 5 | 3.1 | 1.8 | 0.6 | 0 |
| 7 | 3.8 | 2.1 | 1.0 | 0 |
| 11 | 4.1 | 2.6 | 1.1 | 0 |

EXAMPLE 2

Three hundred pounds of safflower oil in a stainless steel tank are heated to 100°C. under vigorous agitation. Nitrogen is bubbled through the oil for one-half hour. The oil is then cooled to 50°C. and 3 pounds of dimethyl sulfoxide (1% basis oil) are thoroughly mixed in. After mixing for 10 minutes 1 pound of powdered sodium methoxide (0.33% basis oil) is added. Mixing is continued, and within 1 minute the entire mass turns chocolate brown and continues to deepen in color for about 5 minutes. After one hour's mixing at 50°C., the oil is cooled to −5°C. and held at that temperature whereupon the interesterification reaction proceeds, while di- and trisaturated triglycerides crystallize and no longer take part in the interesterification reaction. Throughout the process a nitrogen blanket is main-

TABLE III

| | Range[a] | 1. | 2. | 3. | 4. | 5. |
|---|---|---|---|---|---|---|
| Salt | 0–4 | 1.75 | 1.0 | 4.0 | 1.75 | — |
| Skim milk | 0–19.7 | — | 18.8 | — | — | — |
| Skim milk solids | 0–2 | 1.63 | — | — | — | 1.80 |
| Water | 0–19.7 | 16.30 | — | 15.77 | 16.30 | 17.87 |
| K-sorbate | 0–0.1 | 0.10 | — | — | 0.10 | 0.10 |
| Flavor | 0–0.03 | 0.03 | — | 0.03 | 0.03 | 0.03 |
| Ground Soybeans | 0–2 | — | — | — | 1.63 | — |
| EDTA[b] | 0–75 ppm | — | — | 75 ppm | — | — |

[a] to a total of 19.7 to 20 parts
[b] disodium calcium ethylenediaminetetraacetate tained over the oil. The product is sampled periodically over a span of 8¾ days, and the Solid Fat Index (SFI) determined for each periodic sample. The values are shown in Table V.

TABLE V

| Days at −5°C. | SOLID FAT INDEX | | | |
|---|---|---|---|---|
| | 0°C. | 21.1°C. | 33.3°C. | 40°C. |
| ¾ | 2.4 | 1.1 | 0 | 0 |
| 1¾ | 2.9 | 1.6 | 0.4 | 0 |
| 2¾ | 3.3 | 2.6 | 1.3 | 0 |
| 5¾ | 3.4 | 3.2 | 2.0 | 0 |
| 6¾ | 3.0 | 3.4 | 2.4 | 0 |
| 8¾ | 3.6 | 3.6 | 2.7 | 0 |
| (last 2 days held at 0°C.) | | | | |

After the 8¾ day period, the catalyst is inactivated by the addition of dilute mineral acid. The oil is refined, bleached, and deodorized by conventional methods, and a soft margarine is made therefrom.

This margarine thus prepared has the following composition and physical properties.

| | % |
|---|---|
| Interesterified safflower oil | 79.73 |
| Lecithin | 0.21 |
| Monoglyceride from sunflower oil | 0.32 |
| Milk (90% skim; 10% cultured) | 17.85 |
| Salt | 1.75 |
| Flavor, preservatives, colorant | 0.14 |
| Penetration at 45°F. (about 7°C.) 319 | |
| Penetration at 70°F. (about 21°C.) 481 | |
| | 100.00 |

EXAMPLE 3

Three thousand gm. of safflower oil are treated as in Example 1 except that 15 gm. (0.5%) of dimethyl sulfoxide are used in place of 30 gm. (1% basis oil) of dimethyl sulfoxide. The following table shows the SFI values of the oil as the interesterification and crystallization progresses over a period of 22 days.

TABLE VI

| Days Reacted at 0°C. | SOLID FAT INDEX | | |
|---|---|---|---|
| | 0°C. | 21.1°C. | 33.3°C. |
| 2 | 0.7 | 0.3 | 0.2 |
| 6 | 2.4 | 1.7 | 0.8 |
| 8 | 2.5 | 1.8 | 0.8 |
| 10 | 2.7 | 1.7 | 0.8 |
| 17 | 3.4 | 2.1 | 1.1 |
| 22 | 4.8 | 2.9 | 1.7 |

EXAMPLE 4

A 350-pound lot of safflower oil is interesterified by the process described in Example 2 except that the proportion of sodium methoxide is 0.5% basis oil, and the crystallization is carried out for one-half day at −10°C. followed by 5 additional days at 0°C.

The catalyst is deactivated by adding 50 pounds of 10% cold sulfuric acid. The SFI values shown below indicate that the oil is suitable for preparation of a margarine.

TABLE VII

| Days Reacted | Temp. | SOLID FAT INDEX | | | |
|---|---|---|---|---|---|
| | | 0°C. | 21.1°C. | 33.3°C. | 40°C. |
| ½ | −10°C. | 1.3 | 0 | 0 | 0 |
| 1½ | 0°C. | 1.8 | 1.0 | 0 | 0 |
| 4½ | 0°C. | 3.8 | 3.4 | 2.6 | 0 |
| 5½ | 0°C. | 4.2 | 4.3 | 2.8 | 0 |

EXAMPLE 5

Three thousand gm. of safflower oil are treated as described in Example 1 except that 30 gm. of dimethyl formamide (1% of the safflower oil) are used in place of 30 gm. of dimethyl sulfoxide.

The following table shows the SFI values of the oil as the interesterification and crystallization progresses over a period of 21 days at 0°C.

TABLE VIII

| Days at 0°C. | SOLID FAT INDEX | | | |
|---|---|---|---|---|
| | 0°C. | 21.1°C. | 33.3°C. | 40°C. |
| 1 | 2 | 1.6 | 0.8 | 0 |
| 3 | 4.5 | 3.8 | 2.4 | 0 |
| 6 | 3.4 | 2.8 | 2.3 | 0 |
| 10 | 3.6 | 3.1 | 2.0 | 0 |
| 15 | 3.4 | 3.5 | 2.2 | 0 |
| 21 | 4.3 | 4.1 | 2.0 | 0 |

EXAMPLE 6

Three thousand gm. of safflower oil are treated as described in Example 1, except that 150 gm. of dimethyl formamide (5% of the safflower oil) are used in place of 30 gm. of dimethyl sulfoxide.

The following table shows that SFI values of the oil as the interesterification and crystallization progresses over a period of 21 days.

TABLE IX

| Days at 0°C. | SOLID FAT INDEX | | | |
|---|---|---|---|---|
| | 0°C. | 21.1°C. | 33.3°C. | 40°C. |
| 1 | 2 | 1.7 | 0.6 | 0 |
| 3 | 2.7 | 2.3 | 1.6 | 0 |
| 6 | 4.1 | 3.4 | 2.5 | 0 |
| 10 | 3.5 | 3.2 | 2.5 | 0 |
| 15 | 4.0 | 3.5 | 2.7 | 0 |
| 21 | 4.3 | 4.4 | 2.9 | 0 |

EXAMPLE 7

The following example shows that the oil, after randomization, may be prechilled for prolonged periods, in this instance 3 days, to shorten the time required for reaction at 0°C.

Three hundred and fifty pounds of safflower oil are randomized at 50°C. for 1 hour, the catalyst being sodium methoxide at 0.5%, and the aprotic substance being dimethyl sulfoxide at 0.75%, the percentages being by weight of the oil. The randomized product is held for 3 days at −15°C., then held for an additional 3 days at 0°C. The progress of solids formation is seen in the SFI figures below.

TABLE X

SOLID FAT INDEX

| Time, days | Temp. °C. | 0°C. | 21.1°C. | 33.3°C. |
| --- | --- | --- | --- | --- |
| 3 | −15 | 3.3 | 0 | 0 |
| 4 | 0 | 4.2 | 2.1 | 0.7 |
| 5 | 0 | 3.4 | 2.8 | 1.1 |
| 6 | 0 | 3.6 | 3.4 | 2.0 |

EXAMPLE 8

The following example shows the use of 40% dimethyl formamide, basis oil.

3000 gm. of safflower oil are treated as described in Example 1, except that 1200 gm. of dimethyl formamide (40% of the safflower oil) are used in place of 30 gm. of dimethyl sulfoxide.

Periodic samples of the oil are withdrawn during storage at 0°C. for 9 days, and SFI values determined on each sample. The SFI values generally increase with time, as shown in the following table.

TABLE XI

SOLID FAT INDEX

| Days at 0°C. | 0°C. | 21.1°C. | 33.3°C. | 40°C. |
| --- | --- | --- | --- | --- |
| 2 | 1.6 | 1.2 | 0.7 | 0 |
| 4 | 3.2 | 2.4 | 1.5 | 0 |
| 7 | 4.2 | 3.0 | 1.8 | 0 |
| 9 | 4.3 | 3.2 | 1.8 | 0 |

EXAMPLE 9

Two hundred pounds of safflower oil are dried for one hour at 100°C. in a stainless steel vessel equipped with an agitator. During the drying, nitrogen is bubbled through the oil. After cooling to 70°C., 78 pounds of dimethyl formamide (39% basis safflower oil) are added to the oil followed by 1 pound of sodium methoxide powder (0.5% basis oil), and the mixture allowed to react for 1 hour, with continuing agitation. The mixture is then cooled at 0°C. and held at that temperature for 9½ days to allow the interesterification reaction and crystallization to proceed. The mixture is sampled periodically and SFI values determined as set forth in Table XII below.

TABLE XII

SOLID FAT INDEX

| Days at 0°C. | 0°C. | 21.1°C. | 33.3°C. | 40°C. |
| --- | --- | --- | --- | --- |
| 2½ | 3.4 | 3.2 | 1.2 | 0 |
| 4½ | 4.5 | 3.6 | 1.8 | 0 |
| 6½ | 4.1 | 3.4 | 2.4 | 0 |
| 9½ | 4.4 | 3.9 | 2.9 | 0 |

At the end of the 9½ day period at 0°C., the catalyst is deactivated by the addition of aqueous phosphoric. acid to the oil, mixed well at 0°C, for 1 hour, heated to 50°C., and the oil and aqueous layer allowed to separate. The aqueous layer is removed and the oil washed with portions of water to remove acid, dimethyl formamide and any other watersoluble matter present.

The oil subjected to the direct interesterification procedure set forth hereinabove is refined, bleached, and deodorized. A soft margarine is made from this oil by the process described hereinbefore.

The margarine has excellent spreadability. It is plastic in consistency and has a penetration of 364 at 45°F. (about 7°C.).

EXAMPLE 10

Three hundred pounds of safflower oil are treated as in Example 9, except that 60 pounds of dimethyl formamide (20% basis safflower oil) is used, and the interesterification is allowed to proceed for three-fourths days at a temperature of −10°C., then for 12 additional days at 0°C.

The SFI values for the interesterified oil are as follows:

TABLE XIII

SOLID FAT INDEX

| Time, days | Temp. °C. | 0°C. | 21.1°C. | 33.3°C. | 40°C. |
| --- | --- | --- | --- | --- | --- |
| ¾ | −10 | 1.4 | 0.6 | 0 | 0 |
| 1¾ | 0 | 2.2 | 1.1 | 0 | 0 |
| 2¾ | 0 | 2.4 | 2.0 | 0.8 | 0 |
| 5¾ | 0 | 2.3 | 2.7 | 1.7 | 0 |
| 7¾ | 0 | 2.6 | 3.2 | 2.3 | 0 |
| 9¾ | 0 | 3.1 | 4.0 | 3.3 | 0 |
| 12¾ | 0 | 3.2 | 4.2 | 3.6 | 0 |

The interesterified oil is deactivated with dilute phosphoric acid, washed, refined, bleached, and deodorized. A soft margarine made therefrom by the process described hereinbefore has excellent spreadability and is otherwise satisfactory. The texture of the margarine described as very slightly rough, and the penetration of two batches is 395 to 403 at 45°F. (about 7°C.).

EXAMPLE 11

This experiment shows the effect on solids development of using a mixture of dimethyl sulfoxide and dimethyl formamide along with sodium methoxide.

Three hundred and fifty pounds of safflower oil are treated as in Example 1, except that 1% by weight of a mixture of 3 parts by weight of dimethyl sulfoxide and 1 part by weight of dimethyl formamide is added to the oil in place of 30 gm. of dimethyl sulfoxide. Temperatures at which crystallization and continuing interesterification are allowed to proceed also differ from those in Example 1. In the present experiment, oil is randomized for 3 hours at 30°C. The reaction mass is held for one-half day at −20°C., then for a further 6 days at 0°C.

TABLE XIV

SOLID FAT INDEX

| Time, days | Temp. °C. | 0°C. | 21.1°C. | 33.3°C. |
|---|---|---|---|---|
| ½ | −20 | 2.8 | 0 | 0 |
| 1½ | 0 | 0.6 | 0 | 0 |
| 3½ | 0 | 3.3 | 1.7 | 0.6 |
| 6½ | 0 | 4.5 | 3.5 | 2.3 |

EXAMPLE 12

This experiment shows that a sodium salt of a fatty acid monoglyceride may be used as the catalyst.

Seven and one-half gm. of safflower monoglyceride and 15 gm. of sodium methoxide are reacted together in xylene over a steam bath and under vacuum for 15 minutes to remove the methanol formed by the reaction. The mixture is then cooled slightly and 30 gm. of dimethyl sulfoxide in about 30 gm. of xylene added. The mixture is further heated under vacuum for about 10 minutes, whereupon the mass becomes brown in color. The brown mass, which consists essentially of the sodium derivative of the monoglyceride (Na monoglyceridate), is transferred to 3000 gm. of dry safflower oil at 50°C. and the mixture held for one hour at 50°C. with stirring. The mixture is transferred to mason jars, which are stored for 10 days at 32°F., and sampled periodically for solid fat content determination by SFI values. The SFI values are shown in the following table.

TABLE XV

SOLID FAT INDEX

| Days at 0°C. | 0°C. | 21.1°C. | 33.3°C. | 40°C. |
|---|---|---|---|---|
| 3 | 3.3 | 2.3 | 0.9 | 0 |
| 5 | 3.4 | 2.6 | 1.1 | 0 |
| 7 | 3.9 | 2.5 | 1.6 | 0 |
| 10 | 4.6 | 3.3 | 1.9 | 0 |

Examples 13–15 demonstrate the applicability of the instant invention to sunflower oil.

EXAMPLE 13

Three thousand gm. of sunflower oil are dried at 150°C. for one-half hour under nitrogen. The oil is cooled to 70°C. and 30 gm. of dimethyl sulfoxide (1% basis oil) is added, with mixing. Twelve gm. of sodium methoxide (0.4% basis oil) are added as a slurry in xylene. After reacting for one hour at 70°C. the oil is transferred to mason jars, sealed, and held at 0°C. for further interesterification and crystallization. The samples are analyzed for SFI values periodically over a time of 19 days, with the results shown in Table XVI below.

TABLE XVI

SOLID FAT INDEX

| Days at 0°C. | 0°C. | 21.1°C. | 33.3°C. | 40°C. |
|---|---|---|---|---|
| 3 | 5.1 | 3.1 | 2.1 | 0 |
| 5 | 5.8 | 3.5 | 2.5 | 0 |
| 7 | 5.4 | 4.3 | 3.0 | 0 |
| 10 | 5.9 | 4.4 | 3.2 | 0 |
| 14 | 6.0 | 4.2 | 3.1 | 0 |
| 19 | 7.0 | 4.4 | 3.7 | 0 |

EXAMPLE 14

Three thousand gm. of sunflower oil are treated as described in Example 13 except that the catalysts are added to the oil while it is at a temperature of 50°C. followed by holding at 50°C. for 1 hour instead of at 70°C. as in Example 13. After the one hour's holding time, the product is transferred to several mason jars and held at 0°C. for 15 days. The product is sampled periodically and SFI values determined. The results are shown in the following table.

TABLE XVII

SOLID FAT INDEX

| Days at 0°C. | 0°C. | 21.1°C. | 33.3°C. | 40°C. |
|---|---|---|---|---|
| 3 | 6.0 | 3.3 | 2.1 | 0 |
| 7 | 6.9 | 4.7 | 3.0 | 0 |
| 10 | 6.5 | 4.5 | 3.5 | 0.3 |
| 15 | 5.7 | 4.9 | 3.7 | 0.9 |

EXAMPLE 15

Three hundred pounds of sunflower oil are dried at 100°C. with vigorous stirring under nitrogen. After cooling to 50°C., 3 pounds of dimethyl sulfoxide (1% basis oil) are added and allowed to mix with the oil. One and one-half pounds of sodium methoxide (0.5% basis oil) are then added and allowed to react for one hour. The oil is then cooled to −10°C. and held at that temperature overnight, than at 0°C. for 6 days. The development of solids is noted by making periodic determinations of SFI values. The values are recorded in Table XVIII below.

TABLE XVIII

SOLID FAT INDEX

| Days at 0°C. | 0°C. | 21.1°C. | 33.3°C. | 40°C. |
|---|---|---|---|---|
| 3 | 7.0 | 4.8 | 4.2 | 1.0 |
| 4 | 7.5 | 5.5 | 4.6 | 1.6 |
| 6 | 10.7 | 6.0 | 5.2 | 2.1 |

The catalyst is deactivated with aqueous phosphoric acid, and the oil is refined, bleached, and deodorized as described hereinbefore.

Margarines in print and in tub (soft margarine) form are made from the aforementioned oil. The margarines have the same compositions as set forth in Example 2.

The margarines have the following characteristics:

| | Print | Tub |
|---|---|---|
| Penetration, 45°F. (7.2°C.) | 272 | 221 |
| Penetration, 70°F. (21.1°C.) | 288 | 259 |
| Spreadability | Excellent | Excellent |
| Texture | Rough | Smooth |

The higher values shown above for penetration indicate that the print margarine is softer than the tub margarine. The greater softness of the print margarine in this instance is attributed to the greater amount of working of the print margarine in the molding operation as compared with the more simple pouring step in the molding of the tub margarine.

EXAMPLE 16

To effect further economies in manufacture, the directed interesterified oil of the present invention may be blended with up to about an equal weight of the randomly interesterified oil from the first step of the instant process, provided that a small proportion of hardstock is used in the final blend.

As an example, 37.6 parts by weight of the oil after the randomization step of Example 2 has been completed, is mixed with 56.4 parts by weight of the directed interesterified oil of Example 2, followed by blending therewith 6 parts of a hardstock having an I.V. of 58 and an SFI of 45.5 at 21.1°C. This blend is emulsified with the aqueous phase and additives set forth in Example 2 and a margarine is made therefrom. In the manufacture of this margarine the churn temperature is maintained at 45°C. to avoid precrystallization prior to entering the "A" unit. The feed rate is 300 pounds per hour and the packing temperature 12.2°C. The margarine has excellent physical stability at room temperature and at −10°F., and has good spreadability. It has an SFI of 3.4 at 21.1°C., a penetration of 308 at 45°F., and 438 at 70°F., and has a linoleic acid to saturated acid ratio of 6.1.

EXAMPLE 17

If desired, safflower oil may be partially interesterified in a shortened period of time to effect a cost saving, and the resulting low solid fat content increased by the use of a hardstock. This still provides a higher ratio of linoleic acid to saturated acid than could be obtained by any other interesterification procedure in the same length of time.

To illustrate, 300 pounds of safflower oil are treated as in Example 2 for 1¾ days, whereupon the SFI at 21.1°C. is 1.6. There is then blended together 95.5 parts of this oil with 4.5 parts of a hardstock having an SFI of 70 at 21.1°C. A margarine is made form 79.73 parts of this blend in accordance with the formula shown in Example 2. The margarine has an excellent spreadability and flavor. Its penetration is 325 at 45°F. (7°C.) and 488 at 70°F. (21.1°C.), the SFI at 21.1°C. is 2.0, and the ratio of linoleic acid to saturated acids is 5.6.

EXAMPLE 18

Butter fat may be blended with directed interesterified safflower or other oil interesterified by the process of this invention, with proportionate reduction in polyunsaturated acid content. Blends with butter are designed for persons who have a personal preference for butter, but who also desire polyunsaturated acids not provided by butter. An advantage of using the interesterified oil of the invention, as in the other products exemplified herein, lies principally in the greater economy of preparation at least partially offsetting the cost of the added butter.

A blend with butter is prepared by interesterifying safflower oil as described in Example 2. Eighty parts by weight of the oil interesterified for 8¾ days and having an SFI of 3.6 at 21.1°C. is blended with 20 parts of butter fat. This blend is emulsified with an aqueous phase to form an emulsion having 79.73% of the oil blend and the balance having the same composition as shown in Example 2. A margarine made from the emulsion has an SFI of 4.6 at 21.1°C., a ratio of linoleic acid to saturated acids of 3.2. The margarine is firm, having a penetration of 183 at 45°F. and 324 at 70°F.

EXAMPLE 19

Safflower oil may be separated into a liquid and a solid fraction and the liquid fraction used as a salad oil which has an exceptionally high ratio of linoleic acid to saturated acids.

For example, 200 grams of a safflower oil interesterified as described in Example 1 and having an SFI value of 4.3 at 21.1°C. is allowed to crystallize at room temperature (about 24°C.) to form a solidified mass. To this solidified mass is added 67 grams of a solution containing 0.5% sodium lauryl sulfate, 2% magnesium sulfate, and 1% aluminum sulfate in accordance with the process of U.S. Pat. No. 3,458,545, and the whole mixed thoroughly, then centifruged at 2,000 r.p.m., whereupon the solid fat with some entrained oil and aqueous matter separate from the oil as a lower layer. The top layer of oil is removed with a yield of about 80%, and has the following characteristics:

| | |
|---|---|
| Iodine Value | 152.3 |
| Refractive Index, 48°C. (butyro refractometer) | 61.4 |
| % Linoleic Acid | 80.0 |
| % Saturated Acids | 6.1 |
| Ratio of Linoleic to Saturated Acids | 13.1 |

This oil is refined, bleached and deodorized and used as a cooking or salad oil.

The solid portion exclusive of the aqueous phase has the following characteristics:

| | |
|---|---|
| Iodine Value | 117.0 |
| Refractive Index, 48°C. (butyro refractometer) | 55.2 |
| % Linoleic Acid | 62.0 |
| % Saturated Acids | 28.8 |
| Ratio of Linoleic to Saturated Acids | 2.2 |

EXAMPLE 20

Liquid oil separated from a directed interesterified oil in the manner described in Example 19 may be blended with a hardstock to produce a margarine having a high ratio of linoleic acid to saturated acids. Examples of such blends and their characteristics are as follows:

| Description of Hardstock | % Hardstock | % Liquid Oil | I.V. Blend of | 0°C. | Solid Fat Index 21.1°C. | 33.3°C. | 40°C. | Ratio Linoleic Acids to Saturated Acids |
|---|---|---|---|---|---|---|---|---|
| 50/50 Blend of CSWOS and PNO I.V. = 41.6 | 15 | 85 | 131.8 | 5.9 | 5.8 | 3.0 | 0 | 5.1 |
| do. | 11 | 89 | 139.4 | 8.2 | 4.4 | 1.9 | 0 | 6.2 |
| 50/50 Blend of CSWOS and PNO I.V. = 49.5 | 20 | 80 | 126.8 | 13.4 | 9.0 | 3.0 | 0 | 4.6 |
| do. | 13 | 87 | 134.6 | 4.5 | 3.9 | 1.4 | 0 | 6.7 |

—Continued

| Description of Hardstock | % Hardstock | % Liquid Oil | I.V. Blend of | 0°C. | Solid Fat Index 21.1°C. | 33.3°C. | 40°C. | Ratio Linoleic Acids to Saturated Acids |
|---|---|---|---|---|---|---|---|---|
| 50/50 Blend of CSWOS and PNO I.V. = 57.7 | 15 | 85 | 141.0 | 6.2 | 1.8 | 0.3 | 0 | 6.2 |
| do. | 10 | 90 | 137.9 | 5.5 | 1.4 | 0.4 | 0 | 8.3 |
| 10/90 Blend of CSWOS and Soya I.V. = 66.2 | 11 | 89 | 136.6 | 8.4 | 3.1 | 0.7 | 0 | 8.1 |
| do. | 24 | 76 | 119.4 | 14.5 | 8.5 | 3.0 | 3.0 | 4.8 |

The percentages by weight of linoleic and saturated acids in the abovementioned liquid oil fraction and hardstock blends are:

|  | % Linoleic Acid | % Saturated Acids | Ratio Linoleic to Saturated Acids |
|---|---|---|---|
| Liquid fraction | 80.0 | 6.4 | 12.7 |
| CSWOS-PNO 50/50 I.V. 41.6 | 0.4 | 52.1 | — |
| CSWOS-PNO 50/50 I.V. 49.6 | 3.4 | 45.0 | — |
| CSWOS-PNO 50/50 I.V. 57.7 | 5.6 | 37.9 | — |
| CSWOS-Soya 10/90 I.V. 66.2 | 7.4 | 30.4 | — |

CSWOS = cottonseed winter oil stearine
PNO = peanut oil
Soya = soybean oil

The blends are hydrogenated to the Iodine Values shown.

EXAMPLE 21

This example shows that the present invention is applicable to cottonseed oil, the formation of solid fat being accelerated by the presence during the interesterification reaction of 1% dimethyl sulfoxide, basis oil.

Reaction without an aprotic substance

A 3000-gram lot of cottonseed oil is dried at 100°C. for one hour, 0.5% powdered sodium methoxide added, and the oil interesterified at 50°C. as described in Example 2. After mixing for 1 hour the oil is transferred to mason jars and held at 0°C. for further reaction over a period of 3 days. The SFI values on samples taken daily over this period are shown in the table below.

TABLE XIX

SOLID FAT INDEX

| Days Reacted | Temp. | 0°C. | 21.1°C. | 33.3°C. |
|---|---|---|---|---|
| 0 | 0°C. | 7.1 | 2.7 | 0.9 |
| 1 | 0°C. | 11.4 | 4.2 | 2.6 |
| 2 | 0°C. | 12.1 | 4.9 | 2.7 |
| 3 | 0°C. | 12.1 | 5.8 | 3.6 |

Reaction with an aprotic substance

A 3000-gram lot of cottonseed oil is treated as described above except that (1% basis oil) of dimethyl sulfoxide is added prior to the addition of the sodium methoxide. The SFI values on samples taken daily over the 3-day reaction period at 0°C. are shown in the table below.

TABLE XIXa

SOLID FAT INDEX

| Days Reacted | Temp. | 0°C. | 21.1°C. | 33.3°C. |
|---|---|---|---|---|
| 0 | 0°C. | 11.3 | 5.0 | 2.9 |
| 1 | 0°C. | 18.0 | 6.0 | 3.8 |
| 2 | 0°C. | 17.9 | 6.3 | 3.9 |
| 3 | 0°C. | 18.4 | 6.4 | 3.4 |

A comparison of Table XIX with Table XIXa shows the effect of the presence of dimethyl sulfoxide in accelerating the rate of solids formation in the randomization step, in view of the data taken after randomizing (0 days reacted at 0°C.) which shows that the product formed in the presence of dimethyl sulfoxide is the randomization step alone has as high a solids content as the product formed in the absence of dimethyl sulfoxide after randomizing followed by 1 days's holding at 0°C. under directed interesterification conditions. Further, the tables show the overall acceleration effect of dimethyl sulfoxide on the rate of solids formation in an interesterification reaction consisting in randomization followed by directed interesterification of 3 days at 0°C.

Having thus described the invention, the modification thereof falling within the invention will be apparent to those skilled in the art, and the invention is to be limited only by the scope of the appended claims.

What is claimed is:

1. A plastic margarine which is an emulsion comprising from about 80–95% of an oleaginous phase and from about 20–5% of an aqueous phase, said oleaginous phase comprising a non-hydrogenated, directed interesterified triglyceride oil and minor additves, said directed interesterified oil having a linoleic acid content of from about 50% to about 79% and a linolenic acid content of not more than about 10% and a solid fat index of about 3 to about 25 at 0°C and about 2 to about 12 at 21.1°C., and wherein said minor additives include stabilizers, emulsifiers, preservatives, flavoring substances, vitamins and colorants.

2. A margarine in accordance with claim 1 having a solid fat index of about 2 to about 7 at 21.1°C.

3. A margarine in accordance with claim 1 having a penetration value between about 200 and about 400 at 7.2°C.

4. A margarine in accordance with claim 1 having a penetration value between about 200 and about 300 at 7.2°C.

5. A margarine in accordance with claim 1 wherein said aqueous phase is skim milk.

6. A margarine in accordance with claim 1 wherein there is present about 5% to about 10% of a hardstock.

7. A margarine in accordance with claim 1 wherein said hardstock is a mixture of triglycerides having an iodine value between about 35 and about 70, and a saturated acid content between about 25% and about 60%.

* * * * *